(12) United States Patent
Min et al.

(10) Patent No.: US 8,166,899 B1
(45) Date of Patent: May 1, 2012

(54) AIR CAVITY VESSEL HAVING LONGITUDINAL AND TRANSVERSE PARTITIONS

(75) Inventors: Keh-Sik Min, Seoul (KR); Seok-Cheon Go, Ulsan (KR); Hong-Gi Lee, Ulsan (KR)

(73) Assignee: Hyundai Heavy Industries Co., Ltd. (KR)

( * ) Notice: Subject to any disclaimer, the term of this patent is extended or adjusted under 35 U.S.C. 154(b) by 0 days.

(21) Appl. No.: 12/942,458

(22) Filed: Nov. 9, 2010

(51) Int. Cl.
*B63B 1/32* (2006.01)
(52) U.S. Cl. ...................................... 114/67 A
(58) Field of Classification Search ............... 114/67 A; 180/116–130
See application file for complete search history.

(56) References Cited

U.S. PATENT DOCUMENTS

| | | | |
|---|---|---|---|
| 3,146,752 A * | 9/1964 | Ford | 114/67 A |
| 3,481,296 A * | 12/1969 | Stephens | 114/67 A |
| 3,595,191 A | 7/1971 | Grundy | |
| 3,618,552 A * | 11/1971 | Grihangne | 114/67 A |
| 2005/0218610 A1* | 10/2005 | Sankrithi | 280/14.21 |

FOREIGN PATENT DOCUMENTS

| | | |
|---|---|---|
| JP | 2004-114996 | 4/2004 |
| NL | 9301476 | 3/1995 |
| WO | 2005/077746 | 8/2005 |
| WO | 2007/136269 | 11/2007 |

* cited by examiner

*Primary Examiner* — Edwin Swinehart
(74) *Attorney, Agent, or Firm* — Cantor Colburn LLP

(57) ABSTRACT

An air cavity vessel having longitudinal and transverse partitions is provided. The air cavity vessel, which injects air into the bottom thereof to form air layers in order to reduce resistance of the vessel, includes transverse partitions partitioning the bottom in a transverse direction, longitudinal partitions partitioning the bottom in a longitudinal direction, spatial areas defined in a grid pattern by the transverse partitions and the longitudinal partitions, an air supply unit installed in a forebody of the vessel and supplying compressed air into the spatial areas, and a compressor for supplying the compressed air to the air supply unit. Thereby, multiple air layers are formed on a bottom flat area on a small scale.

5 Claims, 4 Drawing Sheets

AIR CAVITY VESSEL HAVING LONGITUDINAL AND TRANSVERSE PARTITIONS

BACKGROUND OF THE INVENTION

1. Field of the Invention

The present invention relates, in general, to an air cavity vessel having longitudinal and transverse partitions and, more particularly, to an air cavity vessel having longitudinal and transverse partitions, in which the longitudinal and transverse partitions are formed on a flat bottom area in a grid pattern, and spatial areas defined by the longitudinal and transverse partitions are supplied with air so as to form multiple air layers on a small scale.

2. Description of the Related Art

A well-known type of air cavity vessels employs technology that reduces the resistance to water by i.e. injecting air into a flat bottom area to thereby form air layers and reduce a submerged surface area of the hull.

One of such air cavity vessels is known from U.S. Pat. No. 3,595,191, in which a bottom of a hull of a seagoing vessel such as an oil tanker is provided with a plurality of downward open type air cavities. Thereby, the submerged surface area of the hull is reduced, so that hydrodynamic characteristics such as resistance to water are improved.

Further, Netherlands Patent No. 9301476 discloses a vessel in which air cavities into which air is injected are formed in a bottom area of the hull. Due to a decrease in the friction between an air layer in the cavity and water passing through the hull, the resistance to water is reduced, so that the consumption of fuel is cut back on to permit more economical propulsion.

However, these known vessels can be used only for flat water. In detail, since air leaks out of the downward open type air cavity when the vessel is rocked and tossed while sailing, the air cavity fails to properly exert its function, and causes the high resistance of the vessel to increase the consumption of fuel, so that the vessel is uneconomically propelled.

Meanwhile, the vessel is propelled by the propeller that is located underwater. The propeller is adversely affected by air arriving from the cavity. This reduces a lift force of propeller blades to make a thrust force and torque unstable or eliminate a thrust force.

To solve such a problem in the conventional air cavity vessel, PCT/NL2007/050242 discloses another air cavity vessel, which includes a hull that has a stern, bow and bottom, an air cavity that is formed at the bottom of the hull and includes a cavity top surface, a front wall, and a front section located nearest to the bow, and an air inlet that is located in the air cavity. Here, the vessel includes a wave deflector defining a lower surface which is situated in the front section of the air cavity and at a distance from the cavity top surface and extends from the front wall substantially in the direction of the stern. In the air cavity vessel, the wave deflector should be separately installed, and thus has an influence on the overall design structure of the entire vessel.

SUMMARY OF THE INVENTION

Accordingly, the present invention has been made keeping in mind the above problems occurring in the related art, and an object of the present invention provides an air cavity vessel having longitudinal and transverse partitions, in which the longitudinal and transverse partitions are formed at the bottom of a large vessel in a grid pattern, and small-scale multiple air layers are defined by spatial areas formed by the longitudinal and transverse partitions.

Another object of the present invention provides an air cavity vessel having longitudinal and transverse partitions, in which air is prevented from leaking out of air layers of the bottom of the vessel toward the vessel by small-scale multiple air layers while the vessel is moving (rolling and pitching) on the waves.

Another object of the present invention provides an air cavity vessel having longitudinal and transverse partitions, in which air is injected from the fore of the vessel into a recess formed in the bottom of the vessel, and an air layer is divided into multiple small parts by the longitudinal and transverse partitions, thereby promoting stable formation of the air layers of the bottom of the vessel, and thus maximizing an effect of reducing resistance. These small-scale multiple air layers relatively increases a surface tensile force, one of the air layer formation mechanisms, when actually applied to a large vessel, thereby helping to form stable air layers.

Another object of the present invention provides an air cavity vessel having longitudinal and transverse partitions, in which edges of the recess of a bottom of the vessel are formed in a shape inclined at a predetermined angle rather than in a perpendicular shape, thereby preventing lateral leakage of the air layers of the bottom of the vessel when the vessel rolls.

Another object of the present invention provides an air cavity vessel having longitudinal and transverse partitions, in which air flow holes are formed in the longitudinal and transverse partitions, and air flows from an air supply unit installed at the fore of the bottom of the vessel in order to form small-scale multiple air layers, thereby making it possible to simplify an air supply system and to facilitate pressure equilibrium in the air layers.

Another object of the present invention provides an air cavity vessel having longitudinal and transverse partitions, in which an air flow hole is formed apart from a lower end of each of the longitudinal and transverse partitions by a predetermined distance, thereby making it possible for compressed air to flow into spatial areas when the vessel is moving (rolling and pitching) on the waves.

Another object of the present invention provides an air cavity vessel having longitudinal and transverse partitions, in which a height of each transverse partition is adjusted within a range less than the height of a recess formed in the bottom of the vessel, thereby making it possible to additionally reduce resistance under the conditions in which the vessel is placed when it is actually moving.

According to one aspect of the present invention, there is provided an air cavity vessel in which air is injected into a bottom thereof to form air layers in order to reduce the resistance thereof. The air cavity vessel includes: transverse partitions partitioning a bottom of the vessel in a transverse direction; longitudinal partitions partitioning the bottom of the vessel in a longitudinal direction; spatial areas that are defined in a grid pattern by the transverse partitions and the longitudinal partitions; an air supply unit that is installed in a forebody of the vessel and supplies compressed air into the spatial areas; and means for supplying the compressed air to the air supply unit, wherein multiple air layers are formed on the bottom flat area on a small scale.

Further, the longitudinal and transverse partitions installed to have the grid pattern may include at least one air flow hole, which enables the spatial areas to communicate with each other such that the air can flow between the spatial areas.

In addition, the transverse partitions may be subjected to height adjustment according to operating conditions of the vessel, and the longitudinal and transverse partitions may be installed on the bottom of the recess formed in a flat area of the bottom of the vessel.

According to the present invention, the air is supplied to the spatial areas partitioned by the longitudinal and transverse partitions, thereby forming small-scale multiple air layers on the flat area of the bottom of the vessel. In comparison with a large-scale single air layer, the air layers are not easily destroyed on still and rough sea conditions, and easily fixed to the bottom of the vessel, so that a resistance reducing effect is continuously and stably produced. This contributes to the air layers being stable, because a surface tensile force between the air and water, one of the air layer formation mechanisms of the bottom of the vessel, is relatively high at the small-scale multiple air layers compared to the large-scale single air layer.

Further, the air is not individually supplied to the spatial areas in order to form the small-scale multiple air layers, but it is supplied only at the fore of the bottom of the vessel. Air flow holes are formed in each partition, and the air flows through the air flow holes, so that it is possible to facilitate pressure equilibrium in the air layers, simplifying the configuration of the air supply means, and minimizing the power required to supply the air.

Further, the edges of the recess of the bottom of the vessel in which the longitudinal and transverse partitions are formed are formed in a shape inclined at an angle of 45° in the central direction of the vessel rather than in a perpendicular shape, thereby preventing the air layers of the bottom of the vessel from leaking in lateral directions when the vessel moves left and right (i.e. rolls), and allowing the air layers to be formed in a stable and continuous manner in the bottom of the vessel when the vessel is at sea.

Also, when the air flow holes supplying air to the spatial areas are formed they are formed to be separated from the lower end of each of the longitudinal and transverse partitions by a predetermined distance, so that the compressed air can smoothly flow into the neighboring spatial area when the vessel is moving (rolling and pitching) on the waves.

Further, when the thickness of the air layer varies depending on various operating conditions, the transverse partitions are moved up and down by hydraulic cylinders, so that an additional increase in resistance caused by the transverse partitions hitting the water can be reduced.

Also, the longitudinal and transverse partitions of the air cavity vessel are installed in a grid pattern, so that the installation is possible without making structural changes to the hull. The number of longitudinal and/or transverse partitions can be changed to suit the length of the vessel when installed, and thus the air cavity vessel can be easily applied to very large vessels.

In addition, the air supply unit installed in the forebody of the vessel is variably operated, so that the air supply unit can increase the amount of air supplied when air leaks from the air layers of the bottom of the vessel which occurs in part because of the movement of a large vessel, thereby rapidly compensating for the leakage.

Further, the air chamber connected with the air supplying means is installed in the forebody of the vessel, so that the air chamber can uniformly supply the compressed air to the spatial areas divided by the longitudinal and transverse partitions. Thus, the air layers are formed in a stable and continuous manner in the bottom of the vessel.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
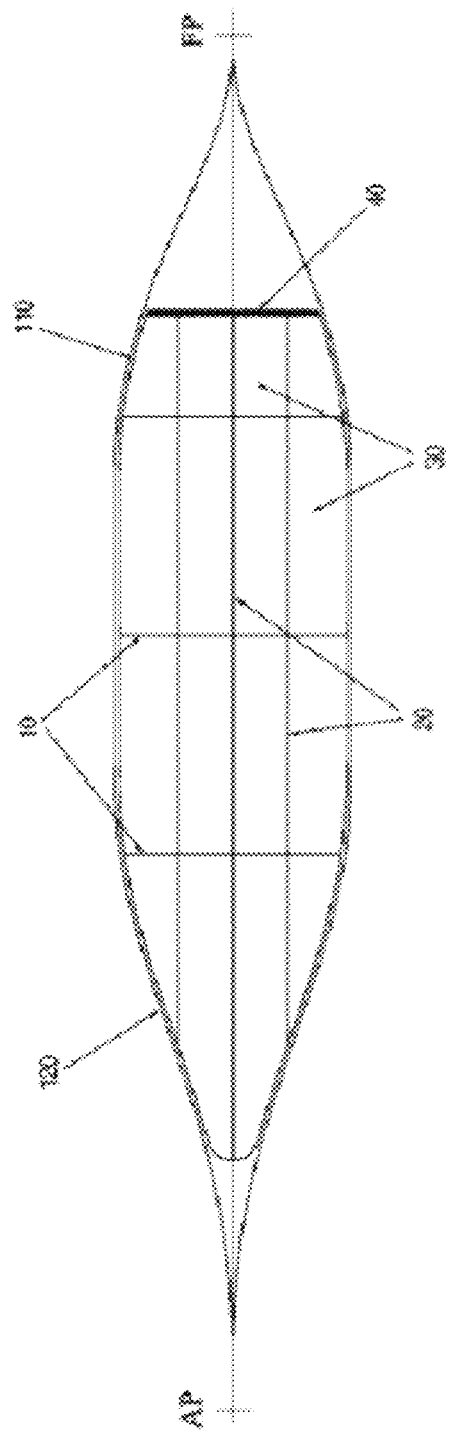
FIG. 1 illustrates the configuration of longitudinal and transverse partitions installed in a recess of the bottom of a vessel according to the present invention.

Reference will now be made in greater detail to an exemplary embodiment of the invention, an example of which is illustrated in the accompanying drawings. Wherever possible, the same reference numerals will be used throughout the drawings and the description to refer to the same or like parts.

As is well known in the art, when air is injected from the fore of the vessel into a recess formed in the bottom of the vessel, friction between the water and a hull surface is converted into a friction between the air and water by a wide air layer formed in the bottom of the vessel, so that the largest proportion of the frictional resistance of the vessel can be remarkably reduced. However, in large vessels that are moving on the waves, it is actually difficult to form a stable air layer under all conditions.

The present invention is directed to forming a stable air layer in a large vessel that is moving in rough seas. To this end, a recess is formed in the bottom of the vessel, and numerous partitions are installed in the recess in longitudinal and transverse directions, thereby causing small-scale multiple air layers rather than a single large air layer to be fixedly formed in the recess of the bottom of the vessel.

Hereinafter, the present invention will be described below with reference to the attached drawings.

Figure 2:
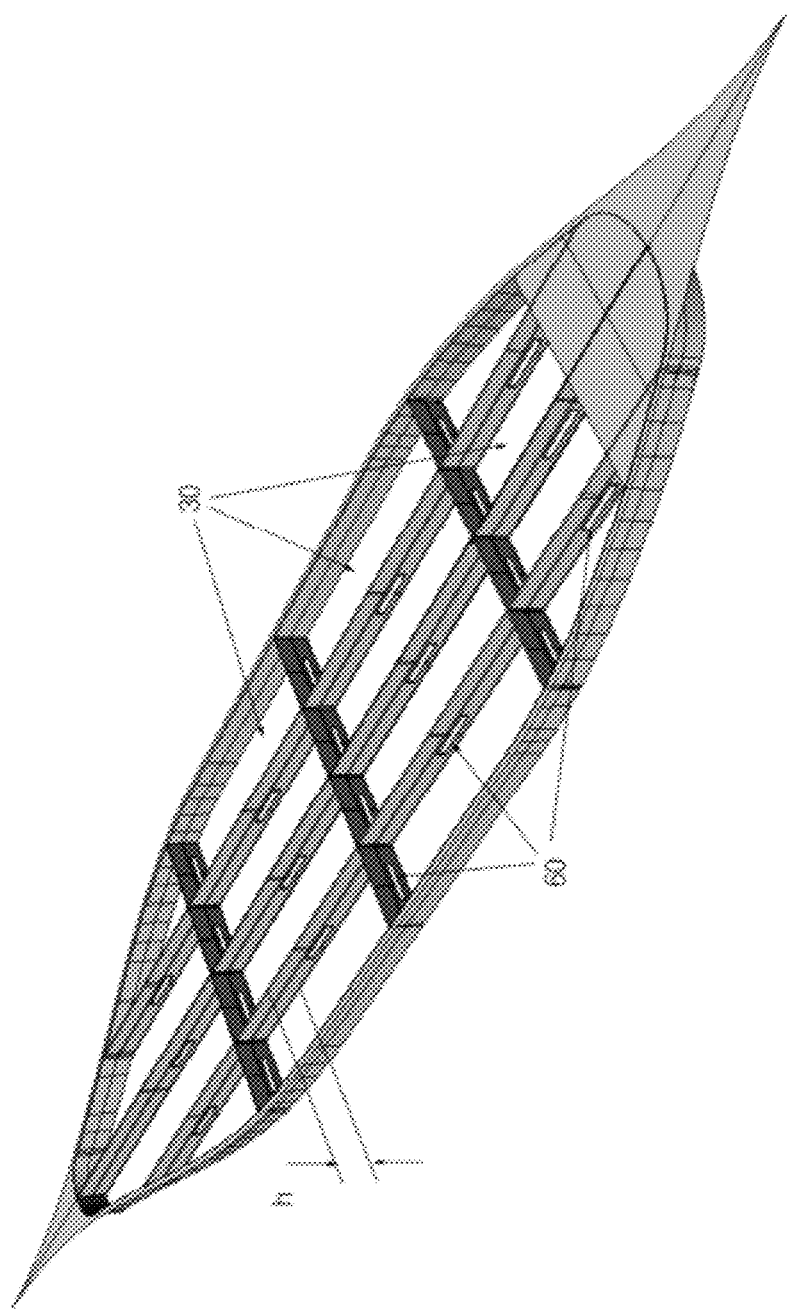
FIG. 2 illustrates the configuration of longitudinal and transverse partitions having holes or gaps to simplify an air supply unit according to the present invention.
Figure 3:
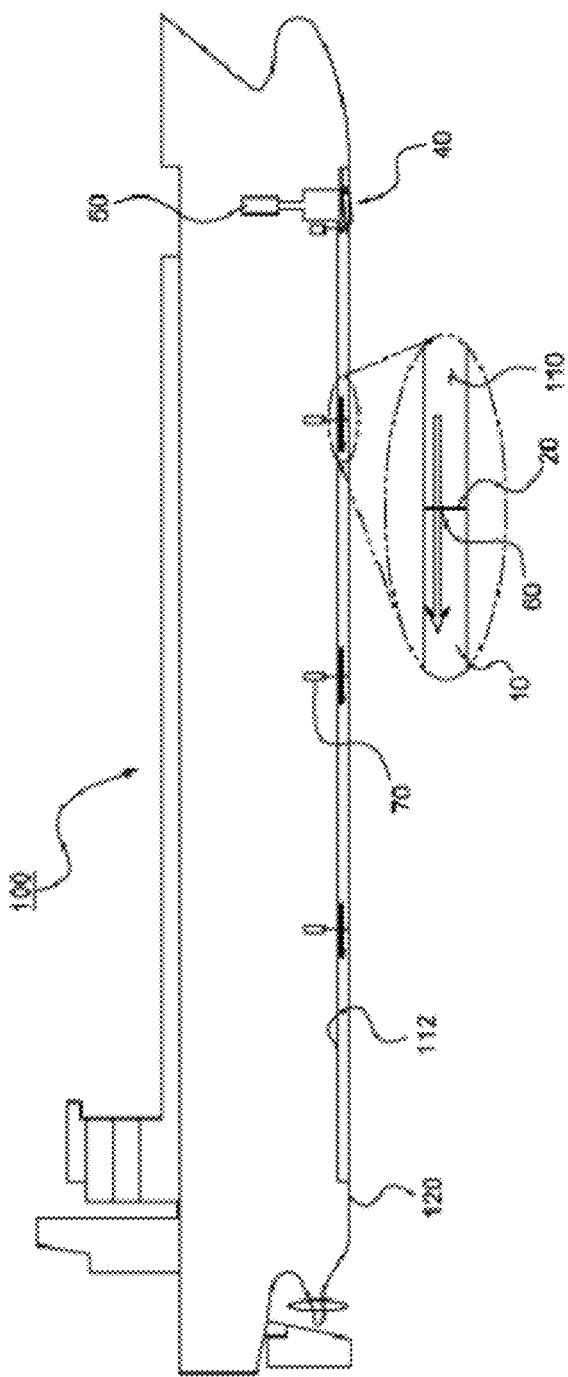
FIG. 3 illustrates a vessel to which the present invention is applied.

FIG. 1 illustrates the configuration of longitudinal and transverse partitions installed in a recess of the bottom of a vessel according to the present invention. FIG. 2 illustrates the configuration of longitudinal and transverse partitions having air flow holes to simplify an air supply unit according to the present invention. FIG. 3 illustrates a vessel to which the present invention is applied. The present invention is directed to an air cavity vessel that injects air into the bottom thereof to form air layers in order to reduce resistance of the vessel. The air cavity vessel includes transverse partitions 10 partitioning the bottom in a transverse direction, longitudinal partitions 20 partitioning the bottom in a longitudinal direction, spatial areas 30 defined in a grid pattern by the transverse partitions 10 and the longitudinal partitions 20, an air supply unit 40 installed in a forebody of the vessel and supplying compressed air into the spatial areas 30, and means 50 for supplying the compressed air to the air supply unit 40, wherein multiple air layers are formed on a bottom flat area 120 on a small scale.

The longitudinal and transverse partitions 10 and 20 are installed in a recess 110 formed in the bottom flat area (i.e. the flat area of the bottom) in order to form the air layers. To this end, the numerous transverse partitions 10 are installed to partition the bottom of the vessel 100 in a transverse direction and to be parallel to each other, and the numerous longitudinal partitions 20 are installed to be parallel to each other so as to intersect the transverse partitions 10 and partition the bottom of the vessel 100 in a longitudinal direction.

The longitudinal partitions 20 and the transverse partitions 10 are installed on the bottom in a grid pattern, and the spatial areas 30 are defined by the longitudinal partitions 20 and the transverse partitions 10 installed in the grid pattern.

The spatial areas 30 are open in a downward direction, and a number of them are formed on the bottom flat area by using the longitudinal and transverse partitions. Small-scale multiple air layers are formed on the bottom flat area by the air supplied into the spatial areas 30.

Further, the longitudinal and transverse partitions 10 and 20 function to prevent the air of the air layers formed on the spatial areas 30 from leaking out of the hull when the vessel is moving (rolling and pitching) in rough seas.

Further, the longitudinal and transverse partitions 10 and 20 installed to have the grid pattern include at least one air flow hole 60, which enables the spatial areas 30 to communicate with each other such that the air can flow between the spatial areas.

In detail, each spatial area 30 formed on the bottom flat area is adapted to communicate with the other neighboring spatial area by the air flow hole 60. Here, the air flow hole is formed apart from a lower end of the longitudinal or transverse partition by a predetermined distance.

Further, the air flow hole 60 is preferably formed at half the height of the longitudinal or transverse partition from a lower end of the longitudinal or transverse partition so as to be free from any influence resulting from the thickness of the air layer and to smoothly supply the air into the spatial areas.

The air supply unit 40 is disposed at a forebody of the vessel so as to be connected with the spatial areas which are located at the fore of the vessel. The compressed air supplied from the air supplying means 50 is supplied to the spatial areas by the air supply unit 40.

That is, in the present invention, the compressed air supplied to the spatial areas located at the fore of the vessel by the air supply unit 40 installed on the forebody of the vessel flows into the other numerous spatial areas via the air flow holes 60.

Figure 4:
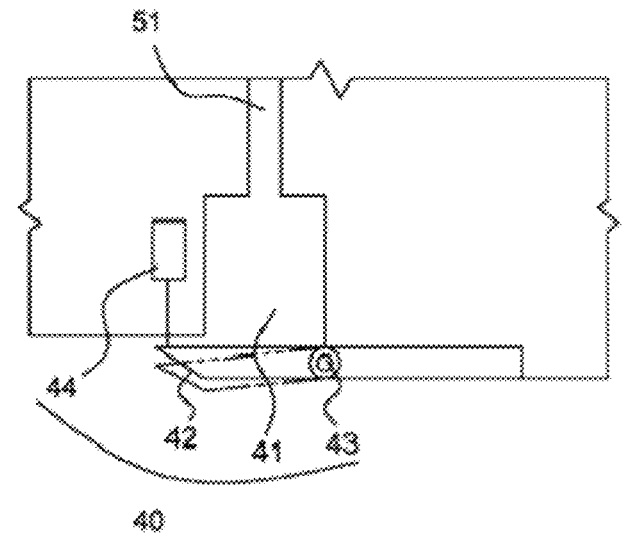
FIG. 4 illustrates the configuration of an air supply unit according to the present invention.

As illustrated in FIG. 4, the air supply unit 40 includes an air chamber 41 formed so as to communicate with the air supplying means 50, a nozzle 42 hinged to the fore of the bottom of the vessel so as to be located at an end of the air chamber 41, and a hydraulic part 44 installed in the vessel so as to be connected with the nozzle 42 and drive the nozzle around a hinge 43.

The air chamber 41 is connected to a piping system 51 of the air supplying means 50, and is formed so as to have a larger area than the piping system, i.e. to be a space expanded from the piping system, so that the compressed air supplied through the piping system is uniformly mixed in the air chamber 41 before flowing to the nozzle 42.

The nozzle 42 transfers the compressed air supplied from the air chamber, and is hinged with the fore of the bottom of the vessel.

The hydraulic part 44 is connected with the nozzle 42, and changes the position of the nozzle to adjust the amount of the compressed air supplied to the spatial area 30. Here, the hydraulic part 41 may employ a hydraulic cylinder.

In this way, in the present invention, the nozzle 42 is adapted to operate around the hinge 43, so that the amount of the compressed air supplied to the spatial area 30 can be adjusted. The air chamber 41 is connected with the piping system 51 of the air supplying means, so that the supplied compressed air can be uniformly mixed and then supplied to the spatial area.

Further, the air supply unit 40 is installed only on the fore of the vessel, and the numerous air flow holes 60 are formed in the longitudinal and transverse partitions 10 and 20. Thus, the air supplied at the fore flows through the air flow holes 60, so that the vessel can be constructed in a more simple structure, and the pressure between the multiple air layers can be made uniform.

Further, the transverse partitions 10 of the present invention are installed in the bottom 112 of the recess 110 formed in the bottom flat area such that their heights are adjusted depending on the operating conditions of the vessel.

To this end, the present invention is adapted to further include hydraulic actuators 70 connected with the transverse partitions 10. Here, the hydraulic actuators 70 may use a hydraulic cylinder.

Further, two or more hydraulic actuators 70 are installed in the hull so as to be connected with each transverse partition 10. Each transverse partition 10 is displaced up and down by the hydraulic actuators 70.

In detail, the thickness of the air layer formed in the recess of the bottom flat area varies depending on the operating conditions of the vessel. If the thickness of the air layer is less than a height h of the longitudinal or transverse partition, the resistance of the vessel may be increased. If the thickness of the air layer of the bottom of the vessel is smaller than a depth of the recess of the bottom flat area depending on the operating conditions of the vessel, water dashes against the transverse partition 10 in a direction perpendicular to the direction in which the vessel is moving, the resistance of the vessel may increase. For this reason, the height of the transverse partition 10 is adjusted to the thickness of the air layer by the hydraulic actuators 70, so that the resistance of the vessel can be additionally reduced.

Here, each transverse partition is preferably operated in the range of a half height thereof by the hydraulic actuators.

Figure 5:
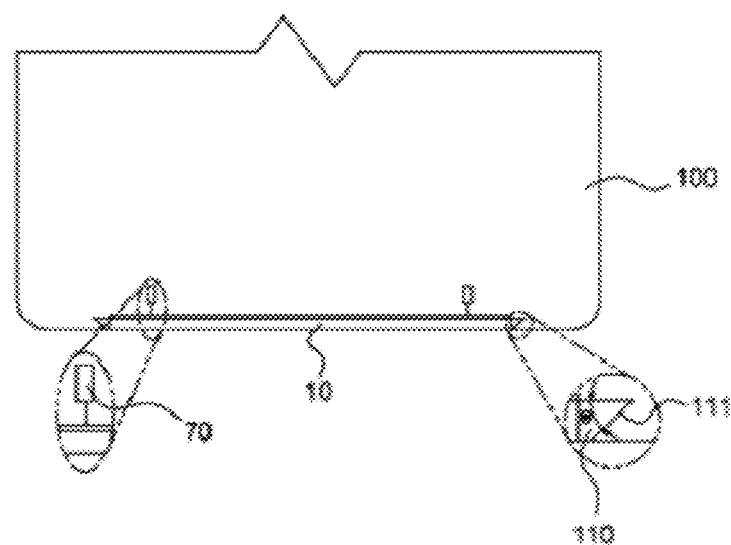
FIG. 5 illustrates the configuration of a transverse partition and a hydraulic actuator according to the present invention.

Further, as illustrated in FIG. 5, edges 111 of the recess 110 are not perpendicular to the bottom of the recess, but form an angle $\theta$ in relation to the central direction of the vessel. Here, the angle $\theta$ is preferably about 45°. The edges 111 of the recess prevent lateral leakage of the air layers of the bottom of the vessel when the vessel moves left and right (i.e. rolls).

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air cavity vessel in which air is injected into a bottom thereof to form an air layer, the air cavity vessel comprising:

transverse partitions that are installed on a bottom of a recess formed in a bottom portion of the vessel to partition the bottom portion of the vessel in a transverse direction;

longitudinal partitions that are installed on the bottom of the recess formed in the bottom portion of the vessel to partition the bottom portion of the vessel in a longitudinal direction;

spatial areas that are defined in a grid pattern by the transverse partitions and the longitudinal partitions;

a hydraulic actuator that adjusts a height of at least one of the transverse partitions and the longitudinal partitions corresponding to a thickness of an air layer formed in the bottom portion of the vessel;

an air supply unit that is installed in a forebody of the vessel and supplies compressed air into the spatial areas, an amount of the compressed air supplied into the spatial areas being controlled by a hydraulic part of the air supply unit; and means for supplying the compressed air to the air supply unit, wherein the air layer is formed in multiple parts on the bottom portion of the vessel.

2. The air cavity vessel as set forth in claim 1, wherein the longitudinal and transverse partitions installed to have the grid pattern include at least one air flow hole formed thereon, which enables the spatial areas to communicate with each other such that the compressed air flows between the spatial areas.

3. The air cavity vessel as set forth in claim 2, wherein the air flow hole is formed at a half height of the longitudinal or transverse partition from a lower end of the longitudinal or transverse partition.

4. The air cavity vessel as set forth in claim 1, wherein the air supply unit includes an air chamber formed to communicate with the air supplying means, a nozzle hinged to a fore of the bottom of the vessel to be located at an end of the air chamber, and the hydraulic part installed in the vessel to be connected with the nozzle and drive the nozzle around a hinge.

5. The air cavity vessel as set forth in claim 1, wherein the recess is formed such that opposite edges thereof are inclined to form an angle relative to a vertical axis of the vessel.

\* \* \* \* \*